(12) United States Patent  (10) Patent No.: US 8,672,596 B2
Condliff et al.  (45) Date of Patent: Mar. 18, 2014

(54) SYSTEM AND METHOD FOR ATTACHING A STUD TO A SURFACE

(75) Inventors: Christopher David Condliff, San Diego, CA (US); James Sullivan Bowlen, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 365 days.

(21) Appl. No.: 13/044,880

(22) Filed: Mar. 10, 2011

(65) Prior Publication Data

US 2012/0230801 A1  Sep. 13, 2012

(51) Int. Cl.
F16B 1/00 (2006.01)
(52) U.S. Cl.
USPC ............................................. 411/82; 411/82.2
(58) Field of Classification Search
USPC ............................. 411/82, 155, 82.2, 107, 156
See application file for complete search history.

(56) References Cited

U.S. PATENT DOCUMENTS

| | | | |
|---|---|---|---|
| 4,523,883 A * | 6/1985 | Peterson et al. | 411/171 |
| 4,647,263 A * | 3/1987 | Macfee et al. | 411/82 |
| 4,668,546 A | 5/1987 | Hutter, III | |
| 4,755,090 A * | 7/1988 | Macfee et al. | 411/82 |
| 4,778,702 A | 10/1988 | Hutter, III | |
| 4,822,656 A * | 4/1989 | Hutter, III | 428/41.8 |
| 4,842,912 A | 6/1989 | Hutter, III | |
| 5,205,690 A * | 4/1993 | Roth | 411/82 |
| 6,727,466 B2 * | 4/2004 | Hutter, III | 219/201 |
| 7,584,582 B1 | 9/2009 | Hutter, III | |
| 8,353,649 B2 * | 1/2013 | Csik et al. | 411/111 |

OTHER PUBLICATIONS

Click Bond Product Guide. Jul. 15, 2009.

* cited by examiner

Primary Examiner — Gary Estremsky
(74) Attorney, Agent, or Firm — Snell & Wilmer L.L.P.

(57) ABSTRACT

Systems, methods and apparatus for applying a stud are disclosed herein. In one embodiment, an applicator for temporarily holding a fastener that includes a base and shaft against a contact surface includes a generally planar body having a lower surface, an upper surface, and a receptacle. The receptacle is configured to releasably receive at least a portion of the shaft of the fastener. The applicator further includes at least two legs extending from the body, each leg being movable between a relaxed position and a contact or applied position.

17 Claims, 4 Drawing Sheets

SYSTEM AND METHOD FOR ATTACHING A STUD TO A SURFACE

CROSS-REFERENCE TO RELATED APPLICATIONS

This application is related to U.S. patent application Ser. No. 13/044,862, entitled "TOOL FOR ATTACHING A STUD TO A SURFACE," and filed on the same date as the present application and hereby incorporated by reference in its entirety.

BACKGROUND

1. Field

The invention generally relates to systems and methods for attaching a stud to a surface.

2. Description of the Related Art

In order to attach various items, such as thermal blankets and control cables to the non-airflow surface of the inner fixed surface (IFS) of a thrust reverser, threaded studs can be bonded to the surface using an epoxy adhesive.

SUMMARY

The systems, methods, and apparatuses of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one of ordinary skill in the art will appreciate how the features of this invention provide for attachment of studs.

One aspect is an applicator for holding a fastener that includes a base and shaft against a contact surface. The applicator includes a generally planar body having a lower surface, an upper surface, and a receptacle. The receptacle is configured to releasably receive at least a portion of the shaft of the fastener. The applicator further includes at least two legs extending from the body. Each leg is movable between a relaxed position and a contact position.

Another aspect is a system for adhering a fastener to a contact surface. The system includes a generally planar body having a lower surface, an upper surface, a receptacle, and at least two legs extending from the body. Each leg is independently movable between a relaxed position and a contact position. The system further includes a fastener that has a base and a shaft. At least a portion of the shaft is disposed in the receptacle at least when the base is in contact with the lower surface of the body.

Another aspect is a method for applying a fastener to a contact surface. The method includes providing an applicator and a fastener. The applicator has a generally planar body including a lower surface, an upper surface, a receptacle, and at least two legs extending from the body. Each leg is independently movable between a relaxed position and a contact position. At least a portion of the fastener is disposed within the receptacle. The method further includes pressing the fastener against a contact surface. The lower surface of the applicator is in contact the fastener. The method further includes bending the at least two legs of the applicator such that at least a portion of each leg contacts the contact surface.

Figure 1:
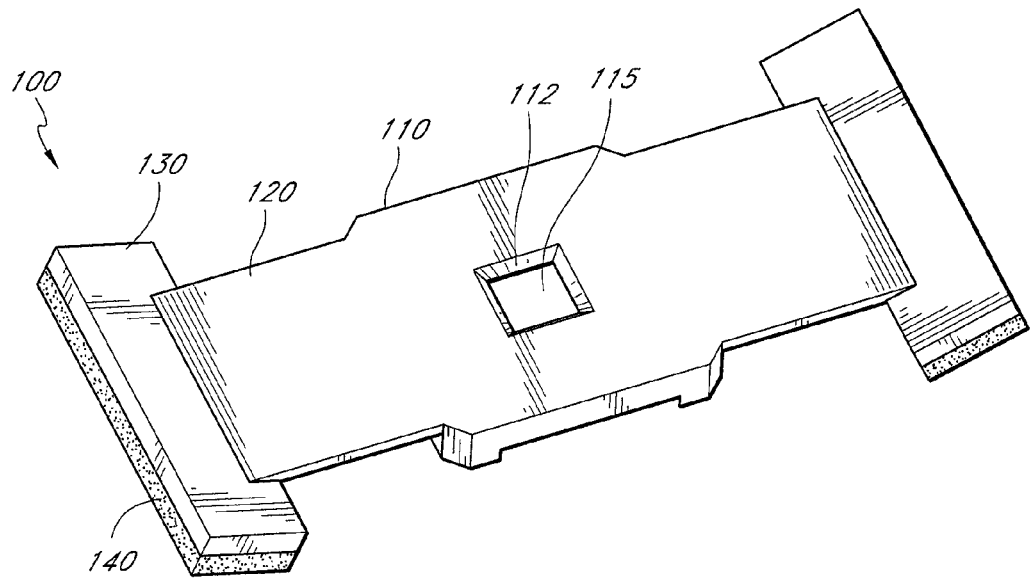
FIG. 1 is a perspective view of an applicator for attaching a stud to a contact surface.

The various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus, device, system, method, or any other illustrated component or process. Like reference numerals may be used to denote like features throughout the specification and figures.

DETAILED DESCRIPTION

Various aspects of methods, systems, and apparatuses are described more fully hereinafter with reference to the accompanying drawings. These methods, systems, and apparatuses may, however, be embodied in many different forms and should not be construed as limited to any specific structure or function presented throughout this disclosure. Rather, these aspects are provided so that this disclosure will be thorough and complete, and will fully convey the scope of these methods, systems, and apparatuses to those skilled in the art. Based on the descriptions herein, one skilled in the art should appreciate that the scope of the disclosure is intended to cover any aspect of the methods, systems, and apparatuses disclosed herein, whether implemented independently of or combined with any other aspect of the disclosure. For example, a system or apparatus may be implemented or a method may be practiced using any number of the aspects set forth herein. In addition, the scope of the disclosure is intended to cover such an apparatus, system, or method which is practiced using other structure, functionality, or structure and functionality in addition to or other than the various aspects of the disclosure set forth herein. It should be understood that any aspect of the disclosure herein may be embodied by one or more elements of a claim.

Figure 4:
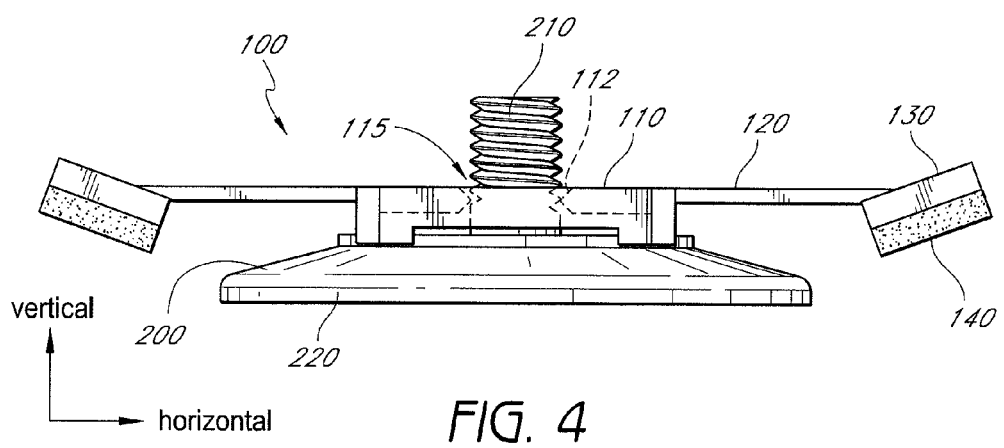
FIG. 4 is a side view of the applicator and stud from FIG. 3 with the legs of the applicator in a relaxed position and the applicator removed from the contact surface.

FIG. 1 is a perspective view of an applicator 100 in a relaxed position. The applicator 100 can be used, as described in detail below, to hold a stud in position on a surface while an adhesive disposed between the stud and the surface cures. The applicator 100 includes a generally planar body 110 having an inner surface 112 defining a receptacle or opening 115 for receiving at least a portion of a stud. The applicator 100 includes two or more flexible legs 120 extending away from the body 110. Each leg 120 includes an anchor foot 130 at the end of leg 120. Each anchor foot 130 is preferably angled relative to its respective leg 120 when the leg 120 is in a relaxed position as is illustrated in FIGS. 1 and 4. An adhesive 140 is disposed on each anchor foot 130. The adhesive 140 adheres to the surface when each anchor foot 130 is in contact with the surface. The adhesive 140 covers at least a portion of each anchor foot 130.

Although the applicator 100 illustrated in FIG. 1 has two legs 120, other embodiments may have more than two legs. For example, in one embodiment, the applicator can have four legs, two extending in a horizontal direction from the body 110 and two extending in a transverse direction from the body 110. In another embodiment, the applicator can have three legs positioned such that the feet generally form the corners of a triangle when viewed from above.

Figure 2:
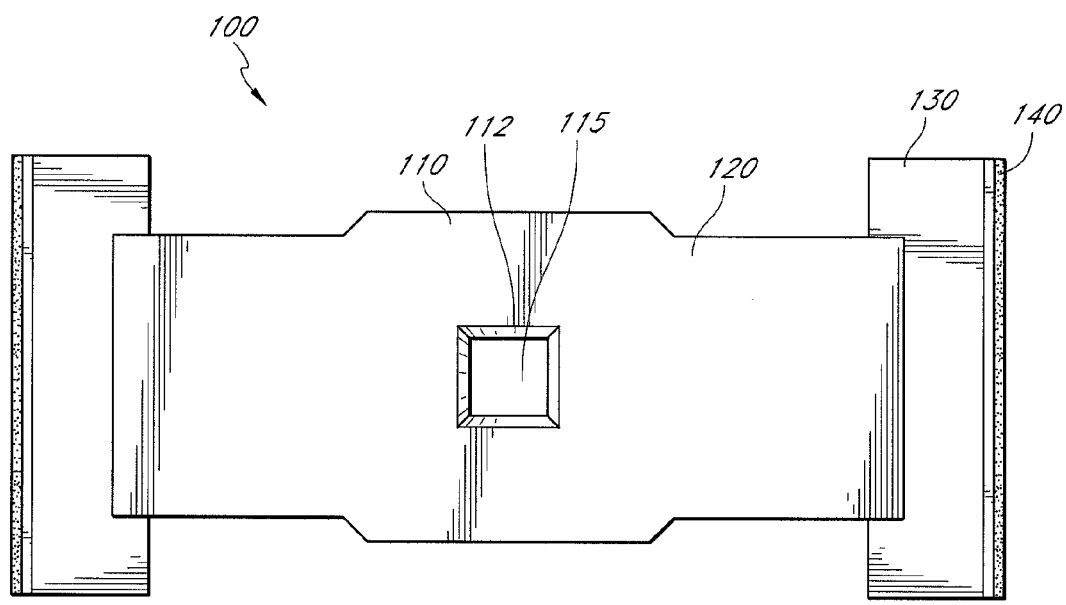
FIG. 2 is a top view of the applicator from FIG. 1.

FIG. 2 is a top view of the applicator 100 of FIG. 1 in a relaxed position. In one embodiment, the applicator 100 is approximately 2 inches long in the horizontal direction and ⅞ of an inch long in the transverse direction. In one embodiment, the opening 115 is a square having sides approximately 3/16 of an inch long. The opening 115 is sized and shaped to releasably receive at least a portion of a stud, as described below. In one embodiment, the legs 120 have a transverse length that is less than a transverse length of the body 110.

Figure 3:
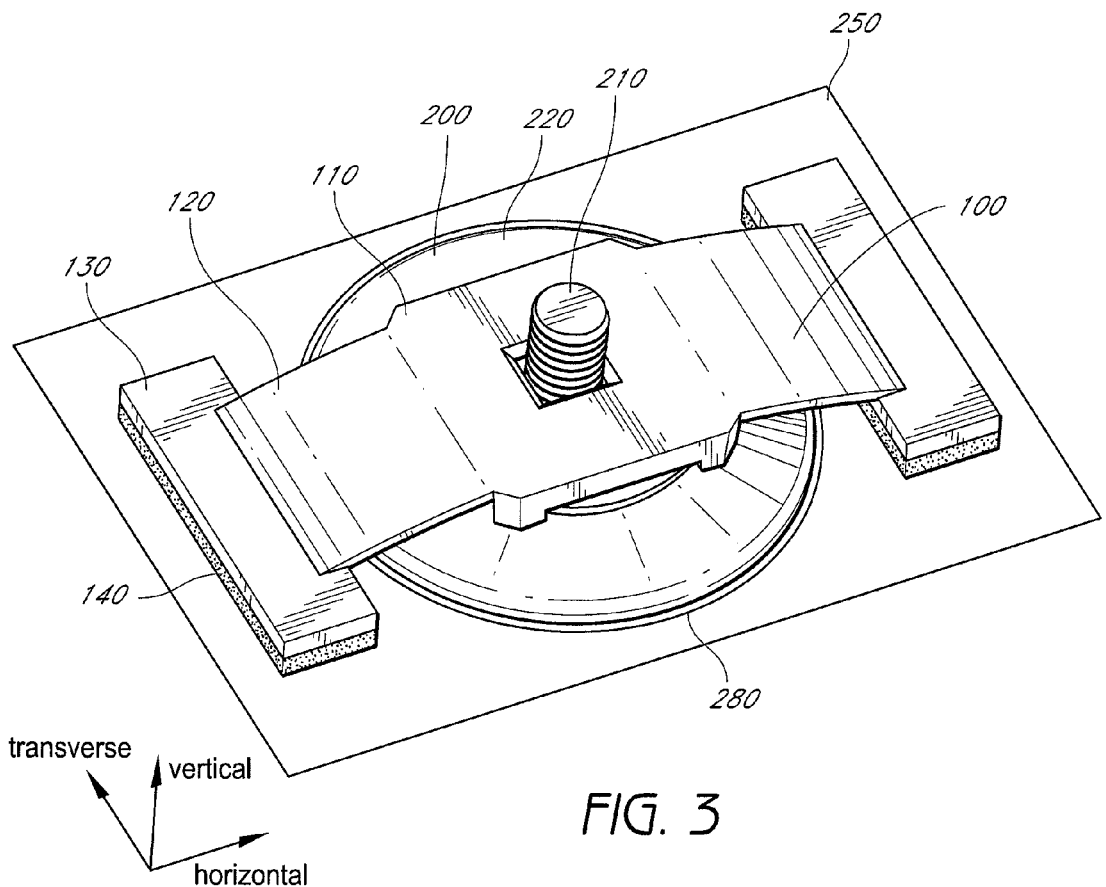
FIG. 3 is a perspective view of the applicator from FIG. 1 pressing a stud against a contact surface to allow an adhesive between the stud and the contact surface to cure.

FIG. 3 is a perspective view of the applicator 100 from FIG. 1 pressing a stud 200 against a contact surface 250 to allow an adhesive 280 disposed between the stud 200 and the contact surface 250 to cure. The stud 200 includes a base 220 and a shaft 210 extending from the base 220. At least a portion of the shaft 210 may be threaded. The base 220 of the stud 200 may be a composite material. The adhesive 280 is disposed between the base 220 and the contact surface 250. When the feet 130 of the applicator 100 are adhered to the contact surface 250, the base 220 of the stud 200 is held against the contact surface 250 by the applicator 100. In one embodiment, the shaft 210 includes a 10-32 thread that is approximately ½ of an inch long and is attached to a 5/4 inches diameter composite base. Although FIG. 3 illustrates a circular base 220, it is to be appreciated that the base may be any shape.

Disposed between the base 220 of the stud 200 and the contact surface 250 is adhesive 280. The adhesive 280 covers at least a portion of the base 220. In one embodiment, the adhesive 280 covers a ring shaped portion of the base 220. Preferably, the adhesive 280 does not cover the center region of the base 220 so as to provide an air gap which thermally insulates the contact surface 250 from the base 220 in the region where the shaft 210 attaches to the base 220. However, in some embodiments, the adhesive 280 does cover the center region of the base 220. In one embodiment, the adhesive 280 is an epoxy. When cured, the adhesive 280 secures the stud 200 in place allowing the applicator 100 to be removed from the shaft 210. The applicator 100 could be removed prior to the adhesive 280 being completely cured.

In the position illustrated in FIG. 3, the legs 120 are slightly bent towards the surface 250 such that the legs 120 are in a contact or attachment position and the adhesive 140 contacts the surface 250. The legs 120 act as leaf springs providing a force that presses the body 110 towards the surface 250. The body 110, in turn, presses the stud 200 against the surface 250 and holds the stud 200 in place at least until the adhesive 280 sufficiently cures.

The applicator 100 can be formed from any suitable material, such as plastic. In particular, the applicator 100 can be formed from a suitable material which is flexible enough to allow the applicator 100 to move from the relaxed position to the contact or attachment position without breaking. Further, the applicator 100 can be formed from a suitable material having a spring constant that applies a force, when in the contact or attachment position, that presses the body 110 towards the surface 250. The magnitude of the force applied to the stud 200 will vary depending on, for example, whether the contact surface 250 is flat or curved. For example, the force applied to the stud 200 in FIG. 7 is greater than the forces applied to the stud 200 in FIGS. 5 and 6.

The adhesive 140 can be formed from any suitable material, such as double-sided adhesive tape. In particular, the adhesive 140 can be formed from an adhesive which maintains the position of the applicator 100 when applied to the surface 250, but can be easily removed once the adhesive 280 has sufficiently cured. In one embodiment, the adhesive may comprise a magnet or a hook-and-loop fastener.

FIG. 4 is a side view of the applicator 100 and stud 200 from FIG. 3 with the legs 120 of the applicator 100 in a relaxed position and the applicator 100 removed from the contact surface 250. In the side view of FIG. 4, the interaction of the inner surface 112 and a threaded portion of the shaft 210 of the stud 200 can be seen. In particular, the inner surface 112 is beveled to at least partially secure the shaft 210 of the stud 200 within the applicator 100. In the side view of FIG. 4, the interaction of the base 220 of the stud 200 and a recess in the lower surface of body 110 can also be seen. In particular, the recess receives at least a portion of the base 220 and restricts the horizontal and transverse motion of the stud 200 with respect to the applicator 100. In the embodiment of FIG. 4, the recess is open to and coaxial with the receptacle 115.

The side view of FIG. 4 also shows the relative vertical position of each foot 130 with respect to the base 220 of the stud 200 when the applicator 100 is in the relaxed position. Although the applicator 100 illustrated in FIG. 4 has straight legs 120 in the relaxed position, other embodiments may have curved legs in the relaxed position which bend further when in the contact or attachment position.

Figure 5:
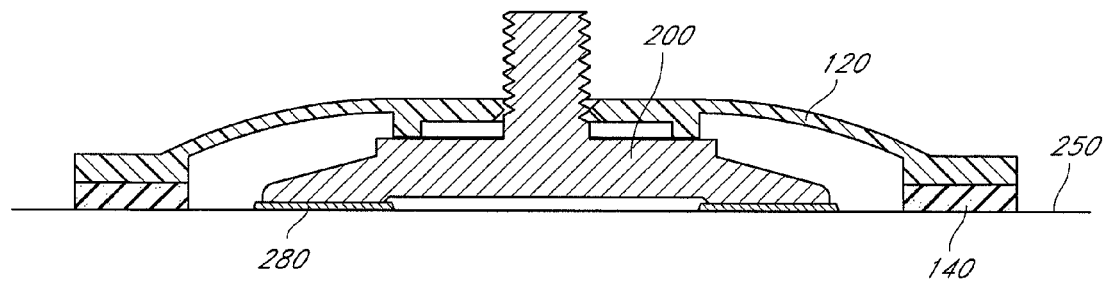
FIG. 5 is a cross-sectional view through the applicator and stud from FIG. 3 with the feet at the ends of the legs in contact with a planar contact surface.

FIG. 5 is a cross-sectional view through the applicator 100 and stud 200 from FIG. 3 with the feet 130 at the distal ends of the legs 120 in contact with a planar contact surface 250. In the contact or attachment position, each leg 120 bends towards the surface 250 until the adhesive 140 contacts the surface 250. The applicator 100 can be removed when the adhesive 280 has sufficiently cured.

Figure 6:
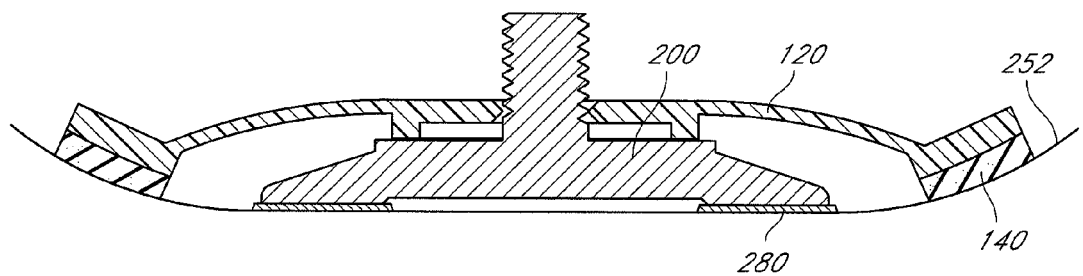
FIG. 6 is a cross-sectional view through the applicator and stud from FIG. 3 with the feet at the distal ends of the legs in contact with a concave contact surface.
Figure 7:
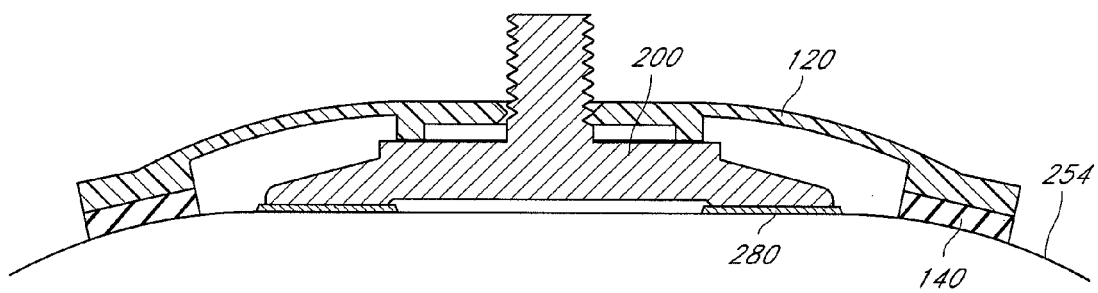
FIG. 7 is a cross-sectional view through the applicator and stud from FIG. 3 with the feet at the distal ends of the legs in contact with a convex contact surface.

FIG. 6 is a cross-sectional view through the applicator 100 and stud 200 from FIG. 3 with the feet 130 at the distal ends of the legs 120 in contact with a concave contact surface 252. In the contact or attachment position, each leg 120 is bent towards the surface 250 such that the adhesive 140 contacts the surface 250. The applicator 100 can be removed when the adhesive 280 has sufficiently cured. Unlike the surface 250 of FIG. 5, the surface 252 of FIG. 6 is not flat. Rather, the surface 252 is concave. Thus, each leg 120 need not bend as far when in contact with the surface 252 of FIG. 6 than when in contact with the surface 250 of FIG. 5.

FIG. 7 is a cross-sectional view through the applicator 100 and stud 200 from FIG. 3 with the feet 130 at the distal ends of the legs 120 in contact with a convex contact surface 254. In the contact or attachment position, each leg 120 bends towards the surface 254 until the adhesive 140 contacts the surface 254. The applicator 100 can be removed when the adhesive 280 has sufficiently cured. Unlike the surface 250 of FIG. 5, the surface 254 of FIG. 7 is not flat. Rather, the surface 254 is convex. Thus, each leg 120 bends more when contacting the surface 254 of FIG. 7 than when contacting the surface 250 of FIG. 5.

Whereas FIGS. 6 and 7 illustrate cross-sectional views of the applicator 100 and stud 200 in contact with non-flat contact surfaces, in other embodiments, the contact surface may be irregular such that the applicator 100, when in contact with the contact surface, is partially twisted about its horizontal axis. Accordingly, the applicator 100 may be formed of a material flexible enough to at least partially twist about the horizontal axis without breaking.

Figure 8:
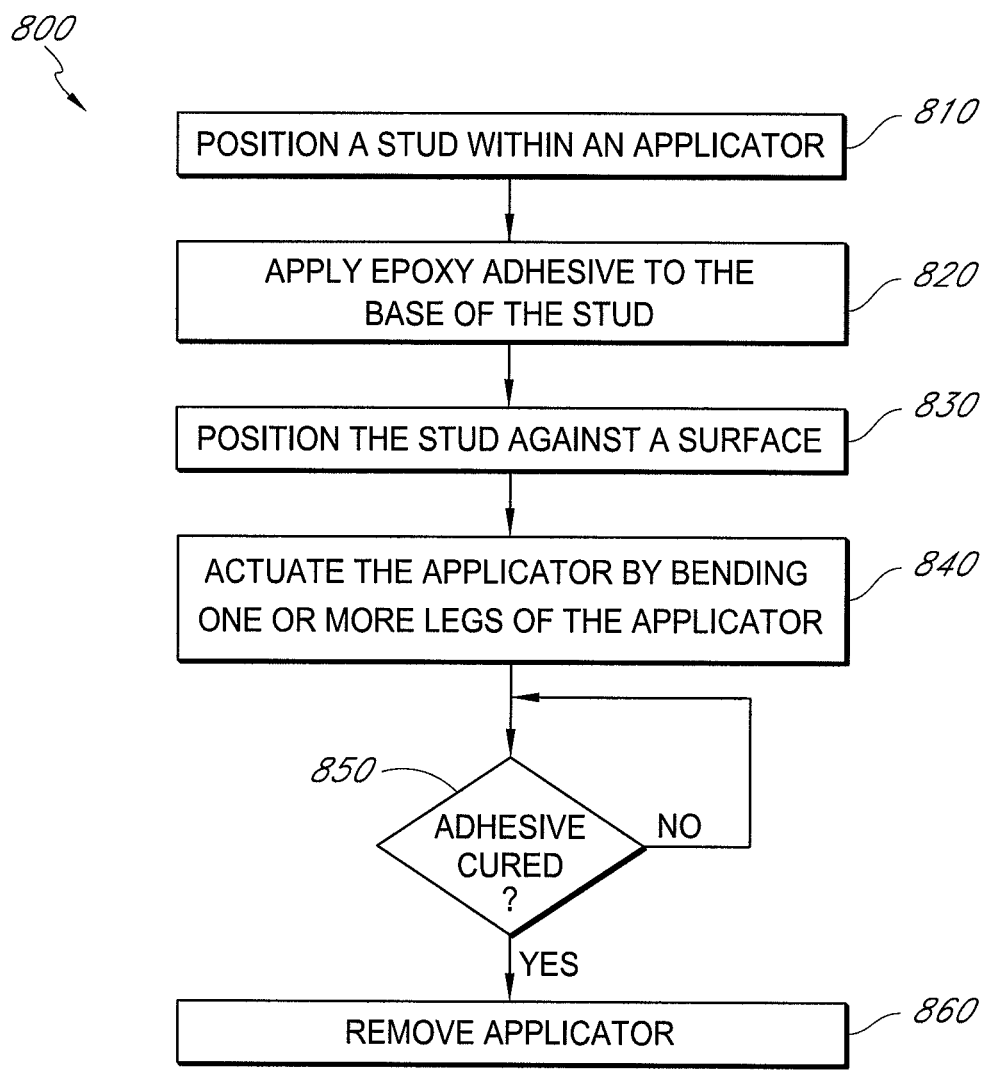
FIG. 8 is a flowchart illustrating a method of applying a stud to a contact surface using the applicator from FIG. 1.

FIG. 8 is a flowchart illustrating a method of applying a stud to a surface. The method can be performed by a human operator, or automatically by a robot. The method 800 begins, in block 810, with at least a portion of a stud being positioned within an applicator. In some embodiments, the stud and applicator may be sold or otherwise packaged together such that the stud is prepositioned within the applicator. Next, in block 820, adhesive is applied to the base of the stud. In some embodiments, the adhesive may be sold or otherwise packaged with adhesive pre-applied to the base of the stud. Thus, in some embodiments of the method, the steps described with respect to block 810 and/or 820 may not be performed. In one embodiment, the adhesive is an epoxy and is applied in a ring on the base of the stud.

In block 830, the stud is positioned against a surface. In some embodiments, the surface is not flat. For example, the surface may be concave or convex. In block 840, the applicator is actuated by bending two or more legs of the applicator towards the surface until an adhesive layer on the legs contacts the surface. Method 800 pauses in block 850 until the adhesive is sufficiently cured. In block 860, the applicator is removed, leaving the stud bonded to the surface by the cured adhesive.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by any presented claims rather than by the foregoing description. All variations coming within the meaning and range of equivalency of presented claims are embraced within their scope.

What is claimed is:

1. An applicator for holding a fastener that includes a base and shaft against a contact surface, the applicator comprising:
    a generally planar body having a lower surface, an upper surface, and a receptacle, the receptacle being configured to releasably receive at least a portion of the shaft of the fastener;
    at least two legs extending from the body, each leg being movable between a relaxed position and a contact position; and
    an adhesive layer covering at least a portion of the at least two legs.

2. The applicator of claim 1, wherein the lower surface defines a recess, the recess being configured to releasably receive at least a portion of the base of the fastener.

3. The applicator of claim 1, wherein the at least two legs comprises two legs on opposite sides of the receptacle.

4. The applicator of claim 1, wherein each of the at least two legs comprises a foot.

5. The applicator of claim 4, wherein the adhesive layer covers at least a portion of the foot.

6. The applicator of claim 4, wherein the foot is disposed at an angle relative to the leg at least when the leg is in the relaxed position.

7. The applicator of claim 1, wherein the receptacle is defined by an inner surface of the body, the inner surface being beveled.

8. The applicator of claim 1, wherein the at least two legs have a transverse length that is less than a transverse length of the body.

9. A system for adhering a fastener to a contact surface, the system comprising:
    a generally planar body having a lower surface, an upper surface, a receptacle, and at least two legs extending from the body, each leg being independently movable between a relaxed position and a contact position;
    a fastener including a base and a shaft, at least a portion of the shaft being disposed in the receptacle at least when the base is in contact with the lower surface of the body; and
    an adhesive disposed on the base of the fastener.

10. The system of claim 9, wherein each leg comprises a foot, each foot being configured to adhere to the contact surface at least when the legs are in the contact positron.

11. The system of claim 10, wherein the contact surface is convex.

12. The system of claim 10, wherein the contact surface is concave.

13. The system of claim 9, wherein the lower surface defines a recess, at least a portion of the base being disposed within the recess.

14. A method for applying a fastener to a contact surface, the method comprising:
    providing an applicator and a fastener, the applicator having a generally planar body including a lower surface, an upper surface, a receptacle, and at least two legs extending from the body, each leg being independently movable between a relaxed position and a contact position, at least a portion of the fastener being disposed within the receptacle;
    applying an adhesive to at least a portion of the fastener;
    pressing the fastener against a contact surface, the lower surface of the applicator being in contact the fastener; and
    bending the at least two legs of the applicator such that at least a portion of each leg contacts the contact surface.

15. The method of claim 14, wherein the applied adhesive covers a ring shaped portion of the fastener.

16. The method of claim 14 further comprising removing the applicator from the fastener.

17. The method of claim 14, wherein each leg comprises a foot, each foot being configured to adhere to the contact surface.

* * * * *